J. L. KELLY.
AUTOMOBILE AXLE TRUSS.
APPLICATION FILED DEC. 1, 1917.
1,299,732.
Patented Apr. 8, 1919.
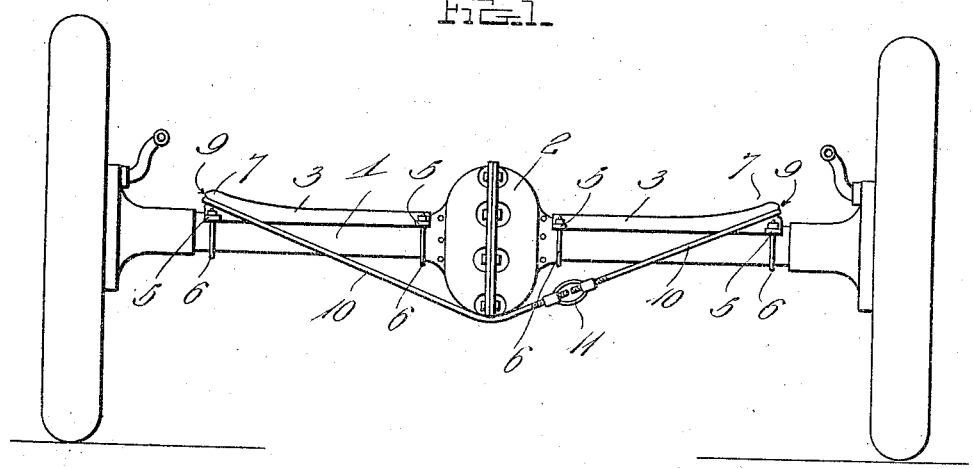
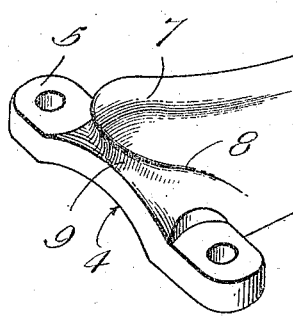
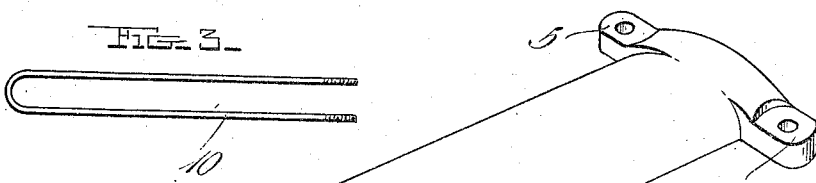
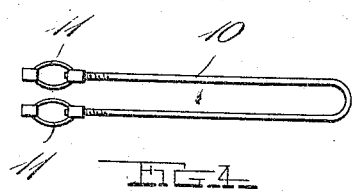
Witness
J. R. Pierce
Inventor
J. L. Kelly
By H. B. Willson & Co.
Attorneys

UNITED STATES PATENT OFFICE.

JAMES L. KELLY, OF NOWATA, OKLAHOMA.

AUTOMOBILE-AXLE TRUSS.

1,299,732.   Specification of Letters Patent.   Patented Apr. 8, 1919.

Application filed December 1, 1917. Serial No. 204,815.

*To all whom it may concern:*

Be it known that I, JAMES L. KELLY, a citizen of the United States, residing at Nowata, in the county of Nowata and State of Oklahoma, have invented certain new and useful Improvements in Automobile-Axle Trusses; and I do declare the following to be a full, clear, and exact description of the invention, such as will enable others skilled in the art to which it appertains to make and use the same.

My invention has for its object to provide an extremely simple and inexpensive, yet a highly efficient truss for the rear axles of automobiles, and with this general object in view, the invention resides in the novel features of construction and unique combinations of parts to be hereinafter fully described and claimed, the descriptive matter being supplemented by the accompanying drawings which form a part of this specification and in which:

Figure 1 is a rear elevation of a portion of an automobile showing the invention applied;

Fig. 2 is a perspective view of one of the channel bars which carry the abutments for the truss; and Figs. 3 and 4 are plan views of the two sections of the truss.

In the drawing above briefly described, the numeral 1 designates the rear axle casing of an automobile, said casing being provided at its center with the usual differential housing 2. On some makes of machines, the axle casing 1 is trussed or braced at the factory, but the need of a truss for the rear axles of machines which are not provided therewith at the factory, is felt particularly when the machine is used for hauling loads exceeding its rated capacity. My invention therefore aims to provide an efficient truss to fulfil this need and to simultaneously reinforce the axle casings which are in some cases of extremely delicate construction.

In attaining the above end, I provide a pair of bars 3 adapted to extend along the upper side of the casing 1 with their inner ends abutting the differential housing 2 as shown in Fig. 1, the lower sides of said bars being formed with longitudinal channels 4 which partially receive the casing 1. Lateral ears 5 are formed integrally with the opposite ends of the bars 3 and U-bolts or the like 6 are passed beneath the axle casing and upwardly through said ears for clamping the bars 3 in place. By this arrangement, it will be obvious that the casing 1 will be effectively reinforced and well protected from above.

The outer ends of the bars 3 are increased in thickness to provide a pair of abutments 7 having rounded outer ends 8 formed with grooves 9 extending transversely of the bars and terminating at the sides of the latter, a pair of U-shaped truss rods 10 straddle the axle casing 1 and the outer ends of said rods are engaged with the grooves 9 of the abutments 7 as shown clearly in Fig. 1. The inner ends of one truss rod 10 extend under the differential housing 2 and are connected by turn buckles 11 with the inner ends of the other rod. It will thus be obvious that by tightening the buckles 11, the rear axle will be effectively trussed. Any tendency of the bars 3 to shift inwardly as the turn buckles 11 are tightened is resisted by the fact that these bars abut the differential housing 2.

From the foregoing, taken in connection with the accompanying drawings, it will be obvious that although my invention is of extremely simple and inexpensive nature, it will be highly efficient and durable for the purposes intended. Since probably the best results are obtained from the several specific details shown and described, these details are preferably employed, but I wish it understood that within the scope of the invention as claimed, numerous minor changes may well be made. In manufacturing the device, the complete attachment will preferably be sold, but in some instances the bars 3 may be furnished separately and the other necessary parts supplied by the purchaser. For this reason, it will be understood that the construction of these bars is the most important feature of the invention.

I claim:

1. A rear axle truss for automobiles comprising a pair of bars adapted to be positioned longitudinally on the upper side of the axle casing at opposite sides of the differential housing and shaped at their inner ends to abut said housing, means for securing said bars to said axle casing, abutments on the outer ends of said bars, and a truss for passage under the differential housing, said truss having U-shaped ends for engagement with said abutments.

2. A rear axle truss for automobiles comprising a pair of bars adapted to be positioned longitudinally on the upper side of the axle casing at opposite sides of the differential housing, the lower sides of said bars being longitudinally channeled to partially receive said casing, the inner ends of said bars being shaped to abut said differential housing, lateral ears on the ends of said bars, U-bolts passing through said ears for securing said bars on said casing, abutments on the outer ends of said bars, and a truss for passage under the differential housing, said truss having U-shaped ends for engaging said abutments.

3. The combination with the rear axle casing of an automobile and the differential housing at the center of said casing; of a pair of bars abutting said differential housing and extending laterally therefrom along the upper side of said casing, means for securing said bars to said casing, abutments formed on the outer ends of said bars, and a truss passing beneath said differential housing and having U-shaped ends engaged with said abutments.

4. The combination with the rear axle casing of an automobile and the differential housing at the center of said casing; of a pair of channel shaped bars extending along the upper side of said axle casing on opposite sides of said differential housing, the channels of said bars receiving said axle casing and the inner ends of said bars abutting said differential housing, the outer ends of said bars being located adjacent the ends of said axle casing and having curved upstanding abutments, lateral lugs on the ends of said bars, U bolts passing through said lugs and around said axle casing to secure said bars and casing rigidly together, and a truss rod extending beneath said differential housing and having looped ends passing around said abutments.

In testimony whereof I have hereunto set my hand in the presence of two subscribing witnesses.

JAMES L. KELLY.

Witnesses:
R. K. Fuller,
G. A. Daubin.

Copies of this patent may be obtained for five cents each, by addressing the "Commissioner of Patents, Washington, D. C."